US008807625B2

(12) United States Patent
Garska (10) Patent No.: US 8,807,625 B2
(45) Date of Patent: Aug. 19, 2014

(54) TONNEAU COVER APPARATUS FOR A PICKUP TRUCK BED

(75) Inventor: Bradley R. Garska, Saline, MI (US)

(73) Assignee: Specialty Vehicle Acquisition Corporation, Warren, MI (US)

( * ) Notice: Subject to any disclaimer, the term of this patent is extended or adjusted under 35 U.S.C. 154(b) by 229 days.

(21) Appl. No.: 13/538,049

(22) Filed: Jun. 29, 2012

(65) Prior Publication Data

US 2013/0341956 A1 Dec. 26, 2013

Related U.S. Application Data

(60) Provisional application No. 61/663,298, filed on Jun. 22, 2012.

(51) Int. Cl.
*B60P 7/02* (2006.01)
(52) U.S. Cl.
USPC .................. 296/100.07; 296/100.16
(58) Field of Classification Search
CPC ....................................... B60J 7/102
USPC ............ 296/107.15, 107, 107.16, 107.18, 296/100.04, 100.06, 100.09, 100.14, 296/100.17, 100.07; 292/256
IPC ........................................ B60P 7/02
See application file for complete search history.

(56) References Cited

U.S. PATENT DOCUMENTS

| 4,221,423 | A | 9/1980 | Stone |
| 4,747,441 | A | 5/1988 | Apolzer et al. |
| 5,427,428 | A | 6/1995 | Ericson et al. |
| 5,636,893 | A | 6/1997 | Wheatley et al. |
| 6,024,402 | A | * 2/2000 | Wheatley ................. 296/100.18 |
| 6,752,449 | B1 | 6/2004 | Wheatley |
| 6,808,221 | B2 | 10/2004 | Wheatley |
| 6,893,073 | B2 | 5/2005 | Wheatley |
| 6,948,760 | B2 | 9/2005 | Marx et al. |
| 7,004,530 | B2 | 2/2006 | Marx et al. |
| 7,021,693 | B2 | 4/2006 | Keller |
| 7,051,781 | B2 | 5/2006 | Grimm et al. |
| 7,066,523 | B2 | 6/2006 | Verduci et al. |
| 7,114,769 | B2 | 10/2006 | Storc et al. |
| 7,163,260 | B2 | 1/2007 | Reitzloff et al. |
| 7,188,888 | B2 | 3/2007 | Wheatley et al. |
| 7,258,387 | B2 | * 8/2007 | Weldy ...................... 296/100.07 |
| 7,303,227 | B2 | 12/2007 | Reitzloff et al. |
| 7,334,830 | B2 | 2/2008 | Weldy |
| 7,399,030 | B2 | 7/2008 | Reitzloff et al. |
| RE41,078 | E | 1/2010 | Schmeichel |
| 7,905,536 | B2 | * 3/2011 | Yue .......................... 296/100.07 |
| 7,938,483 | B2 | 5/2011 | Reitzloff et al. |
| 8,061,758 | B2 | 11/2011 | Maimin et al. |
| 2005/0099033 | A1 | * 5/2005 | Chverchko et al. ...... 296/100.09 |
| 2007/0063529 | A1 | * 3/2007 | Weldy ...................... 296/100.07 |

(Continued)

*Primary Examiner* — Pinel Romain
(74) *Attorney, Agent, or Firm* — Harness, Dickey & Pierce, P.L.C.

(57) ABSTRACT

A tonneau cover apparatus is provided. In one aspect, a tonneau cover apparatus includes a handle or lever, a mount, a locator, a finger, a detent and a complementary peg. In another aspect, a handle and mount are configured such that the handle is substantially horizontal when in a closed position. A further aspect employs at least one locator to align a tonneau cover to a truck bed. Another aspect includes a finger which is coupled to a handle to clamp a tonneau cover apparatus to a truck bed when the handle is in a closed position, thus securing the tonneau cover to the truck bed.

42 Claims, 10 Drawing Sheets

(56) References Cited

U.S. PATENT DOCUMENTS

| | | |
|---|---|---|
| 2008/0129077 A1 | 6/2008 | Weldy |
| 2011/0084515 A1* | 4/2011 | Williamson et al. ..... 296/100.16 |
| 2011/0169296 A1* | 7/2011 | Schrader et al. ......... 296/100.15 |
| 2012/0098292 A1* | 4/2012 | Huotari et al. ........... 296/100.09 |
| 2012/0274092 A1* | 11/2012 | Yue ......................... 296/100.07 |
| 2013/0015678 A1* | 1/2013 | Williamson et al. ...... 296/100.09 |
| 2013/0307287 A1* | 11/2013 | Hang et al. ............... 296/100.01 |

\* cited by examiner

TONNEAU COVER APPARATUS FOR A PICKUP TRUCK BED

CROSS REFERENCE TO RELATED APPLICATION

The present application claims priority to U.S. Provisional Patent Application Ser. No. 61/663,298, filed Jun. 22, 2012, which is incorporated by reference herein.

BACKGROUND AND SUMMARY

The present disclosure relates generally to tonneau covers and more particularly to a latch and locator to align a tonneau cover to a pickup truck bed.

It is known to integrate fasteners into the frame of a tonneau cover to latch the tonneau cover to the side of a truck bed. Exemplary conventional fasteners for tonneau covers are disclosed in U.S. Pat. No. 7,334,830 entitled "Tonneau Cover" which issued to Weldy on Feb. 26, 2008. This patent is incorporated by reference herein. Such fasteners, however, often protrude into a cargo area of the truck bed and interfere with transportation of items within the truck bed.

Some traditional aftermarket, flexible tonneau covers are releasably clamped to the bed of the pickup truck since it can be necessary on occasion to carry loads in the bed that exceed the height limitations of the tonneau cover. Convenient rollup fabric covers can not support heavy weight, such as snow and can have widely varying attachment forces over time and in different temperatures. The clamps, mounting frame, hinges, and hardware of many tonneau covers are often completely separable from the cover and must be kept track of when the cover is in storage. The multitude of hardware involved in securing tonneau covers to truck beds also takes considerable time and effort to install, open, close and remove. When the cover is assembled on the pickup truck bed, the hardware is often positioned in a location that causes interference with cargo (interfering with cargo movement, damaging cargo during loading or unloading, or preventing transportation of cargo all-together).

Often, C-clamps and permanent rail structures are used to secure the tonneau cover to the truck bed. These systems are extremely slow to position and properly install, cause penetration to the cargo bed walls, and are relatively expensive to manufacture. Further, given the diversity of cargo bed construction and wall configurations, it is sometimes necessary to have specific clamps, rails, bows, and corners for specific models of pickup trucks. This disadvantageously causes a multiplicity of parts and tooling, thereby adding expense and manufacturing complexity. Moreover, some of the prior c-clamps used for tonneau covers have been prone to unstable installation due to mismatched surface configurations between the clamp and the portions of the bed walls to which they were applied.

In accordance with the present invention, a tonneau cover apparatus is provided. In one aspect, a tonneau cover apparatus includes a handle or lever, a mount, a locator, a finger, a detent and a complementary peg. In another aspect, a handle and mount are configured such that the handle is substantially horizontal when in a closed position. When the handle is substantially horizontal, it advantageously is out of a normal storage space in a truck bed. A further aspect employs at least one locator to align a tonneau cover to a truck bed. Another aspect includes a finger which is coupled to a handle to clamp a tonneau cover apparatus to a truck bed when the handle is in a closed position, thus securing the tonneau cover to the truck bed.

A method of installing a tonneau cover is also set forth. In one aspect, the method includes aligning a front side of a tonneau cover to a front of a pickup truck bed perimeter by aligning locators on the tonneau cover apparatus with an inner wall of the truck bed. A handle of each tonneau cover apparatus is moved to a closed position thus clamping a claw to the truck bed. The tonneau cover is then unfolded. In an aspect, installation of the tonneau cover on the pickup truck bed is completed in approximately thirty seconds or less.

The tonneau cover apparatus of the present invention is advantageous over traditional devices. For example, use of locators on the tonneau cover apparatus aligns the tonneau cover to the truck bed in a much easier and shorter amount of time than the traditional hardware used to secure traditional tonneau covers to truck beds. This serves to advantageously achieve much quicker and more accurate installation of the tonneau cover on the truck bed, which is ideal for OEM assembly plant installation on a moving assembly line versus traditional after-market installation where customer time is less of a concern. Furthermore in an aspect, the tonneau cover apparatus is advantageously stronger, more durable over time, requires less installation steps, is not prone to loosen when driven down bumpy roads, etc. Additional advantages and features can be found in the following description and appended figures.

DETAILED DESCRIPTION

The preferred embodiment of a pickup truck tonneau cover 30 of the present disclosure is shown in FIGS. 1-9. Pickup truck beds 32 have a generally rectangular perimeter 34. In some cases the perimeter has four 90 degree corners and is rectangular. In other cases, the generally rectangular shape is slightly trapezoidal in nature, with the two forward corners having an angle slightly less than 90 degrees and the two rearward corners having an angle that is slightly more than 90 degrees. The difference in these angles from 90 degrees is typically less than about 2 degrees, thereby maintaining the overall generally rectangular shape of the truck bed perimeter 34. As used herein, "pickup truck bed" includes the horizontal bottom wall, generally vertical side, front, and back walls and any upper turned walls extending from the side, front and back walls.

An outer frame 38 of tonneau cover 30 generally corresponds to outer perimeter 34 of pickup truck bed 32. Side rails 42 extend along the lateral sides of truck bed 32. A front rail 46 and a rear rail 50 extend in a cross-car direction. Side rails 42 are coupled to and span between front rail 46 and rear rail 50. Each side rail 42 includes three sub-rails coupled together via two mirrored pairs of hinges 54, 58 that permit tonneau cover 30 to be manually folded in a tri-fold configuration. Notwithstanding, it should alternately be appreciated that two, four, or other folding section quantities can be employed, although some benefits may not be realized.

Figure 6:
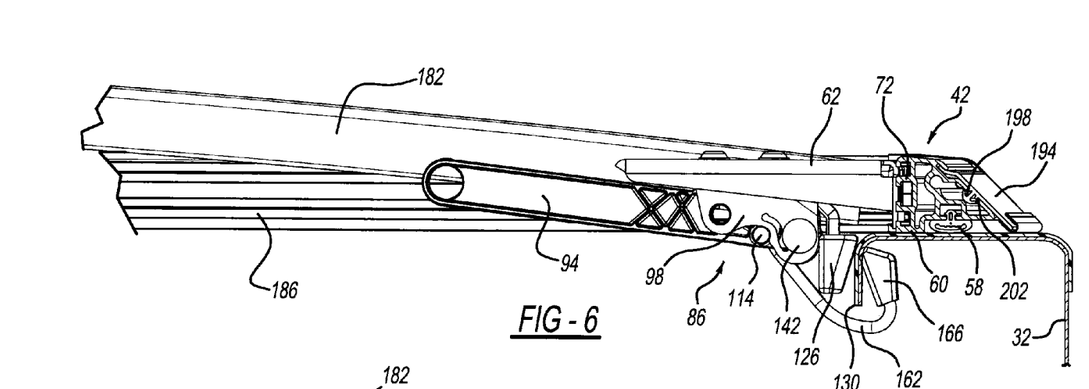
FIG. 6 is a cross-sectional view taken along line 4-4 of FIG. 3, showing the tonneau cover apparatus in a latched orientation.
Figure 7:
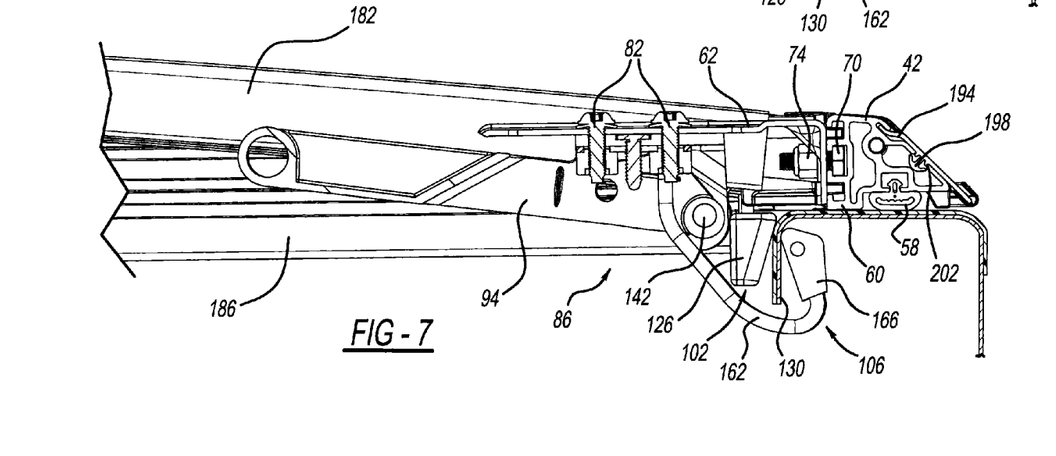
FIG. 7 is a cross-sectional view, taken along line 5-5 of FIG. 3, showing the tonneau cover apparatus in the latched orientation.
Figure 8:
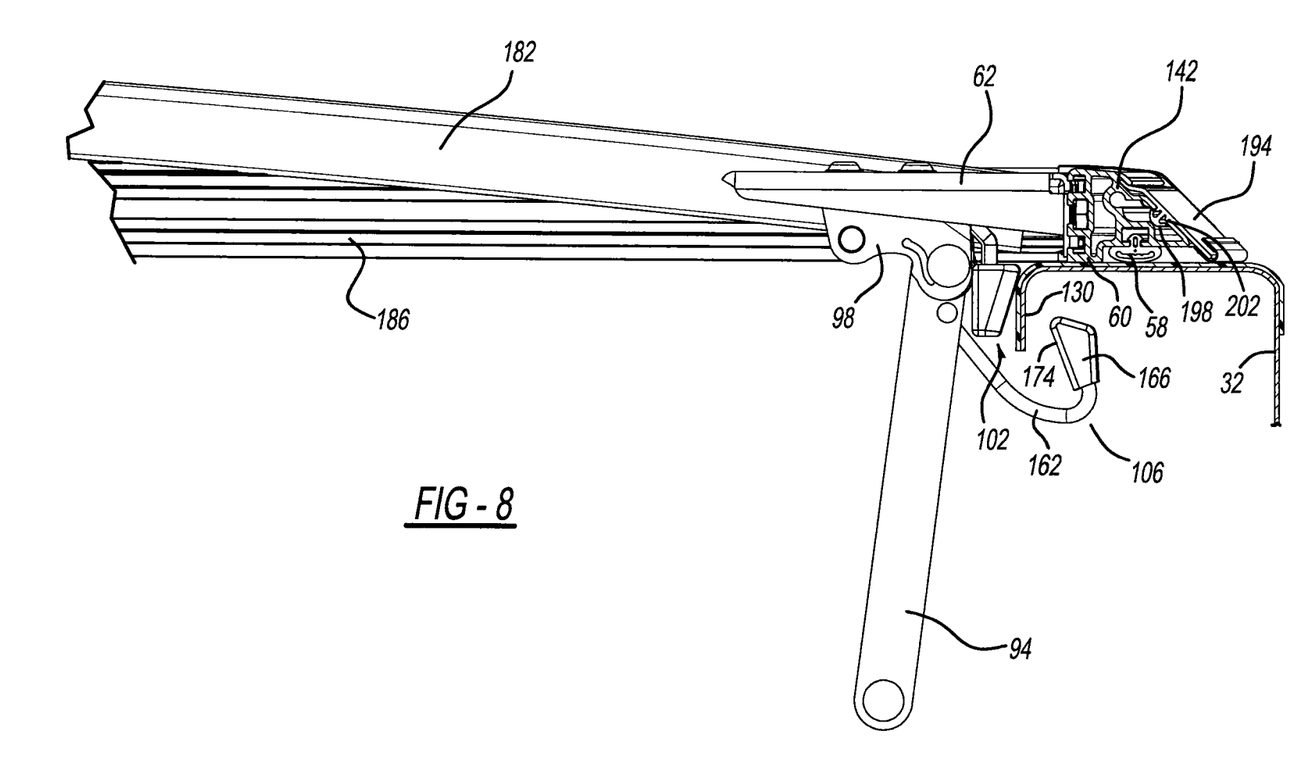
FIG. 8 is a cross-sectional view of the tonneau cover apparatus, similar to FIG. 4, but in an unlatched orientation.
Figure 9:
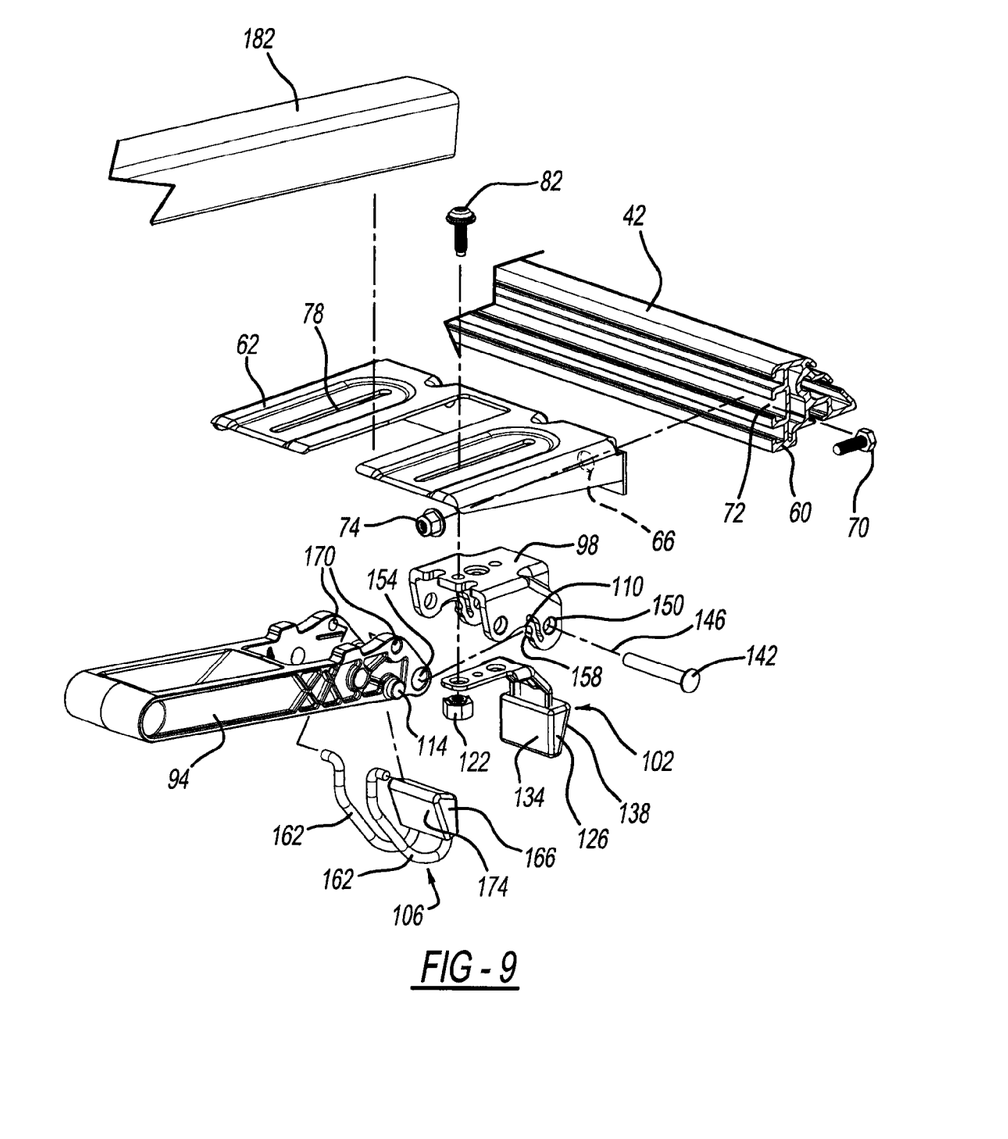
FIG. 9 is an exploded perspective view showing the tonneau cover apparatus.

Rails 42, 46, and 50 each include a seal 58 to keep moisture out of truck bed 32 and a stop 60 to prevent the seal 58 from over-compressing (FIGS. 6-8). Stop 60 extends along at least a majority of rails 42, 46, 50. When tonneau cover 30 is latched to truck bed 32, stop 60 prevents seal 58 from further compressing (due to pressure on and the weight of the top of tonneau cover 30) and releasing tonneau cover 30 from the latched position.

Figure 1:
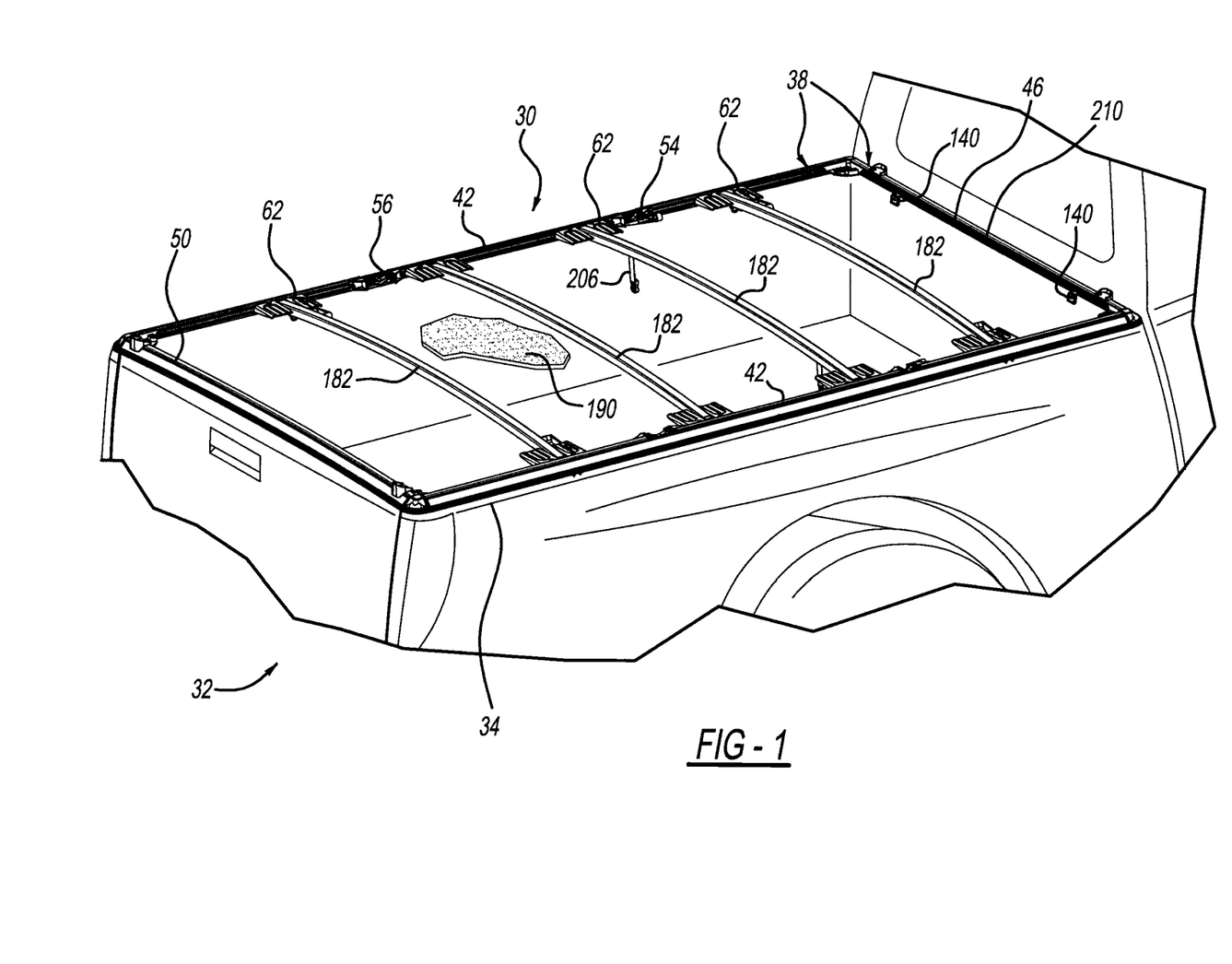
FIG. 1 is a fragmentary perspective view showing a tonneau cover apparatus mounted to a pickup truck bed.
Figure 2:
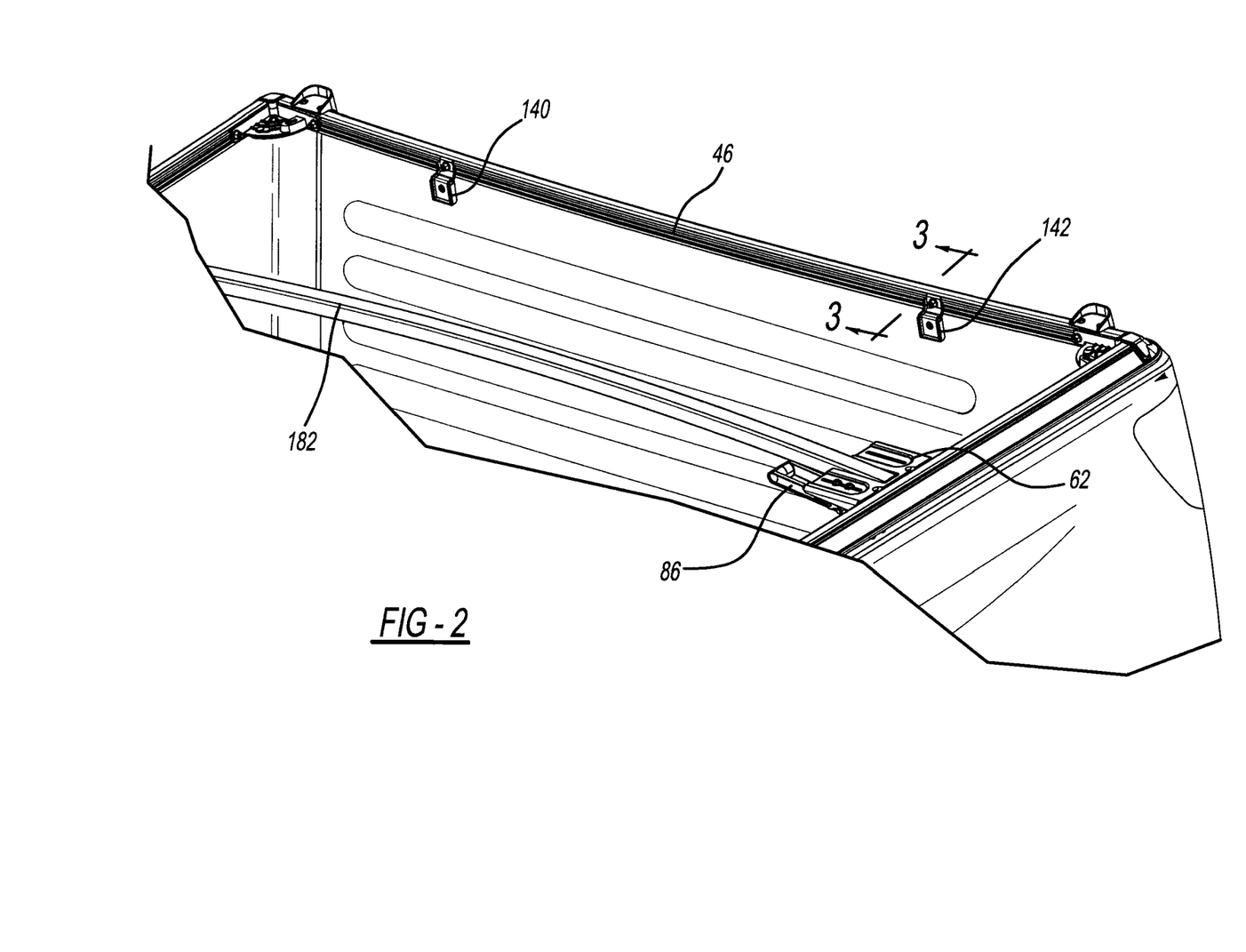
FIG. 2 is a fragmentary perspective view showing a tonneau cover apparatus mounted to a pickup truck bed.
Figure 3:
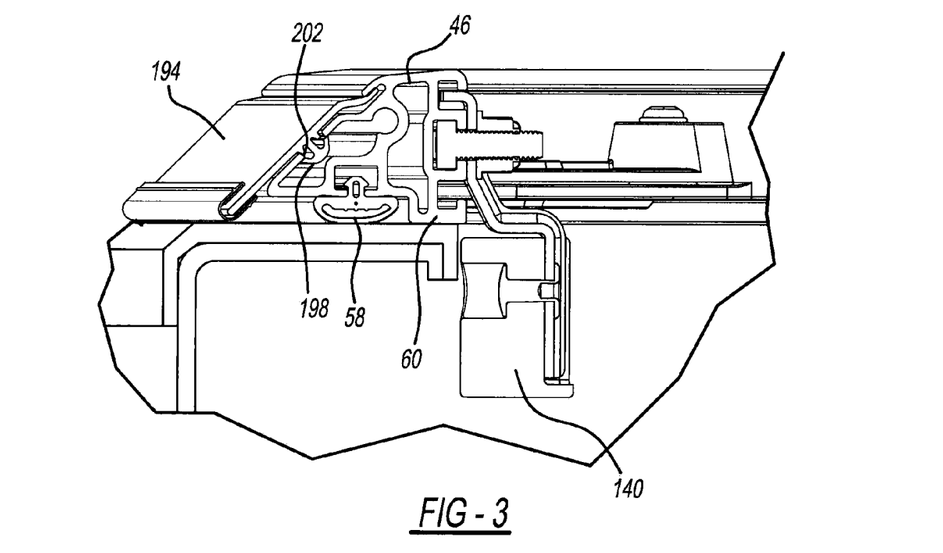
FIG. 3 is a cross-sectional view taken along line 3-3 of FIG. 2, showing the tonneau cover apparatus.
Figure 4:
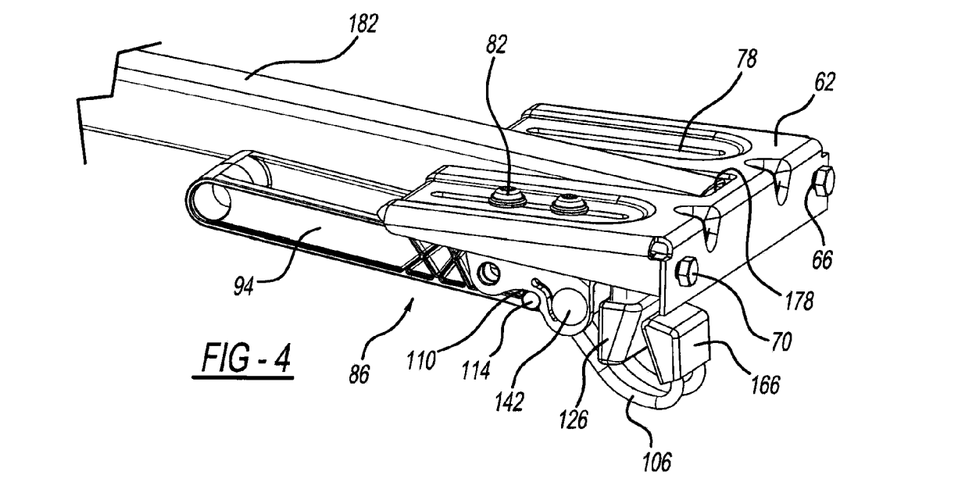
FIG. 4 is an enlarged perspective view showing the tonneau cover apparatus.
Figure 5:
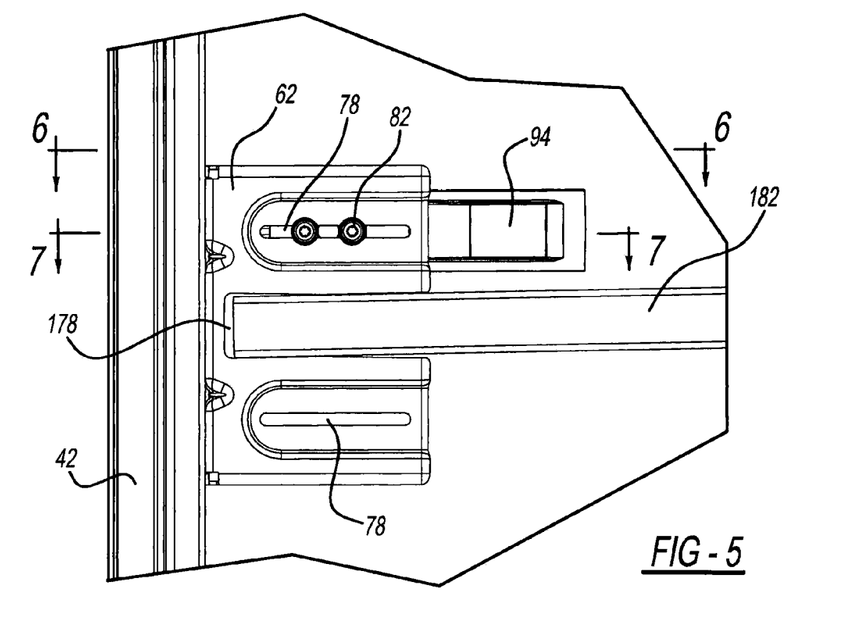
FIG. 5 is a top elevational view showing the tonneau cover apparatus.

Intermediate cross-car rail brackets 62 are arranged in mirrored pairs that are coupled to opposing side rails 42 of outer frame 38. A first of each pair of cross-car brackets 62 is coupled to one side rail or side frame member 42, and the second of each pair of cross-car brackets 62 is coupled to opposing side rail or side frame member 42. Each bracket 62 includes apertures 66 through which screws or bolts 70 extend. The head of bolt 70 may be captured in a T-shaped channel of side rail member 72. A nut 74 may be threaded onto bolt 70 to secure bracket 62 to side frame member 42, similar to what is seen in the embodiment of FIG. 5.

Intermediate rail brackets 62 preferably have a metal die cast construction and a symmetrical configuration to permit the same bracket 62 to be positioned along either side of outer frame 38. Bracket 62 includes apertures 78 through which screws or bolts 82 can mount a tonneau cover apparatus 86 as desired.

Tonneau cover apparatus 86 further includes a latching mechanism for securing tonneau cover 30 to an interior wall 90 of truck bed 32. Tonneau cover apparatus 86 solves conventional installation issues by including a handle or lever 94, a mount 98, a locator 102, a claw or finger 106, a detent 110 and complementary peg 114 for securing handle 94 in a closed position. By implementing locator 102 into each tonneau cover apparatus 86, significantly faster installation times can be achieved. Tonneau cover apparatus 86 is mounted such that handle 94 is substantially vertical when in an unlatched or extended position and handle 94 is substantially horizontal when in a latched or folded position, thus eliminating the interference with cargo that generally occurs in traditional tonneau covers.

Mount or bracket 98 on the tonneau cover apparatus 86 is attached to bracket 62. The attachment includes the bolt 82 with a nut 122 threaded onto it (FIG. 9) or may alternately include other fasteners such as screws, adhesives, welds, rivets, etc. The mount further includes detent 110 for retaining handle 94 in a closed position.

Mount 98 is attached to locator 102 such that locator 102 is fixed to mount 98. The attachment includes the bolt 118 and nut 122 or any other fasteners as previously described.

Locator 102 includes a wedge 126 used to locate tonneau cover apparatus 86 to an interior wall 130 of truck bed 32. Wedge 126 has a substantially vertical portion 134 on its back side and a diagonal portion 138 (or wedged portion) on the side of wedge 126 directly adjacent to the interior wall 130 of the truck bed 32. The initial taper of wedge 126 assists in guiding insertion and location of stacked tonneau cover 30 when assembled to truck bed 32 prior to latching. The angle of diagonal portion 138 of wedge 126 is such that when tonneau cover apparatus 86 is clamped to interior wall 130, mount 98 is pulled from a horizontal position to a position that is generally between 1 and 5 degrees less than the horizontal position to increase a force between claw 106 and interior wall 130 and thus increase a force between wedge 126 and interior wall 130 to assist in keeping tonneau cover 30 secured to interior wall 130. Wedge 126 has an elastomeric cover, but can alternately be rubber, or an engineering grade polymer, such that the texture of the material allows for a higher coefficient of friction to reduce the ability of wedge 126 from slipping on the surface of interior wall 130. The elastomeric material construction further protects painted truck bed 32 from being scraped or damaged by locator 102.

Inner wall 130 includes at least one tab 140 for aligning tonneau cover 30 with truck bed 32. Taper portion 138 of wedge 126 guides wedge 126 into tab 140 and pulls the tonneau cover 30 into alignment with truck bed 32.

Mount 98 is attached to handle 94 by a pivot pin 142 such that handle 94 can rotate about a substantially horizontal and fore-and-aft aligned axis 146 running through the center of pin 142 from the open or extended position to the closed or folded position. Mount 98 and handle 94 includes apertures 150,154 through which pin 142 passes, coupling mount 98 to handle 94. While handle 94 is attached to mount 98 by a pin 142, other fasteners could be used to attach handle 94 to mount 98, and the fastener of the present disclosure is not intended to limit the fastening of handle 94 to mount 98. When handle 94 is in the closed or folded position, it is above a horizontal plane extending across truck bed 32, even with the edge of downwardly turned interior wall 130 (FIGS. 1, 2 and 10 wherein the plane extends across the width of truck bed 32 even with 130). This position places handle 94 out of the normal storage compartment of truck bed 32 such that handle 94 does not contact items in truck bed 32.

Handle 94 further includes peg 114 located near aperture 154 and aligning with detent 110 when tonneau cover apparatus 86 is assembled. When moving handle 94 from the open position to the closed position, a slightly larger force can be applied to snap peg 114 over an edge 158 of detent 110. Edge 158 of detent 110 protrudes past the diameter of peg 114, thus retaining peg 114 in detent 110 (FIGS. 4 and 6) and securing handle 94 in a locked position. When moving handle 94 from the closed position to the open position, the slightly larger force can be applied to snap peg 114 over edge 158 of detent 110, thus releasing handle 94 from the locked position.

Claw or finger 106 is attached to handle 94. Finger 106 includes at least one arm 162 and a grip 166. Arms 162 attach finger 106 to handle 94 by acting as pins passing through apertures 170 in handle 94. Furthermore, arms 162 are preferably formed from metal to increase the durability of arms 162. Grip 166 has a substantially vertical portion 174 that is directly adjacent to interior wall 130 when tonneau cover apparatus 86 is clamped to interior wall 130. When clamped to interior wall 130, grip 166 applies a force to interior wall 130 that is complemented by the force between wedge 126 and interior wall 130 to secure tonneau cover apparatus 86 to interior wall 130. Grip 166 may be formed from a similar material as wedge 126 on locator 102 and has an elastomeric cover, but can alternately be rubber material or an engineering grade polymer, such that the texture of the material allows for a higher coefficient of friction to reduce the ability of grip 166 to become unclamped from interior wall 130. Further, the elastomeric material protects painted truck bed 32 from being scratched or damaged by finger 106.

Brackets 62 also include a main recess 178 into which an end of an intermediate cross-car bow 182 is received. Main recess 178 includes apertures through which threaded screws or bolts may couple an end of intermediate rail 182 to bracket 62.

The intermediate bows 182 span between and are coupled to side rails 42 via each pair of intermediate rail brackets 62. One end of each intermediate bow 182 is coupled to the one of a pair of brackets 62. The opposing end of intermediate bow 182 is coupled to the other of the pair of brackets 62.

Along with each bowed, intermediate, cross-car bow 182, a corresponding tension member 186 (FIG. 6-8) may also span between and may couple to opposing side rails 42 via each pair of brackets 62. One end of each tension member 186 may couple to the one of a pair of brackets 62. The opposing end of the tension member 186 may couple to the other of the pair of cross-bar brackets 62.

A flexible textile member 190 covers intermediate cross-car bows 182 and outer frame 38 and is coupled thereto. For example, flexible textile member 190 can be joined to a plastic coupling member 194 including a barb 198 that that couples with a cooperating slot 202 along the outside of side rails 42.

Figure 10:
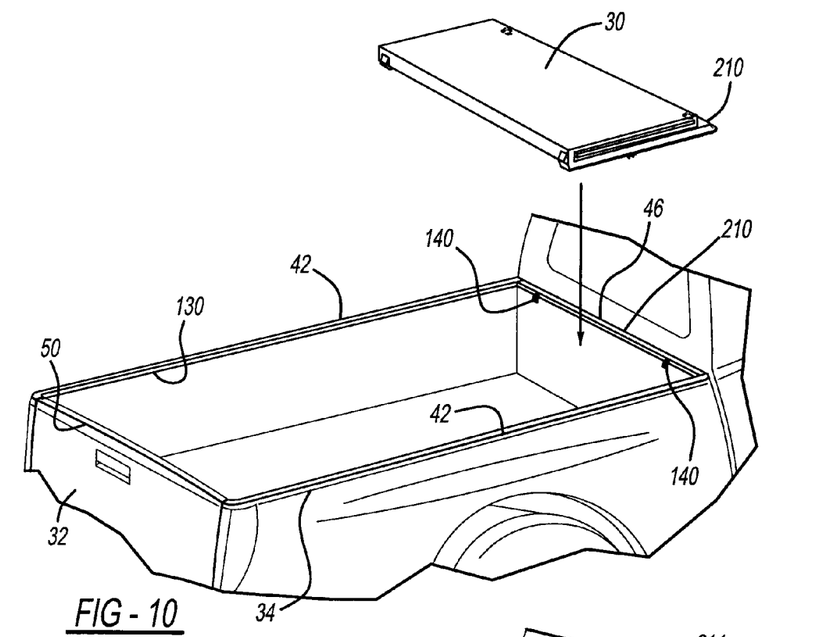
FIGS. 10-14 are a series of perspective views showing the installation procedure for the tonneau cover apparatus onto the pickup truck.
Figure 11:
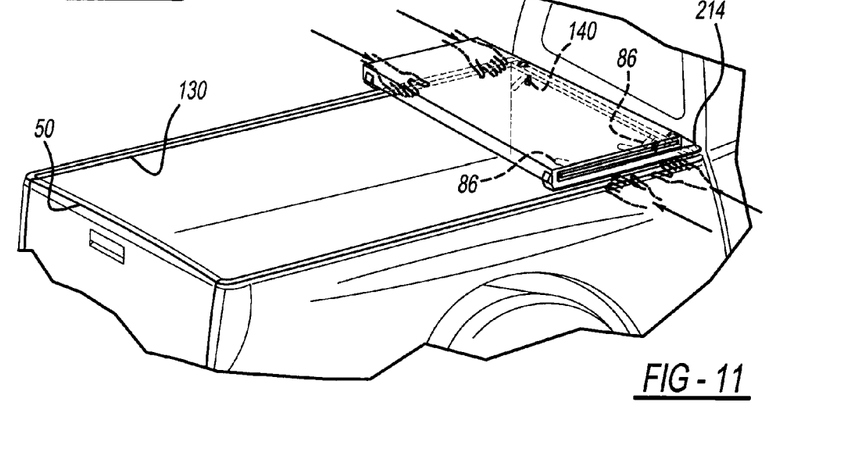
Figure 12:
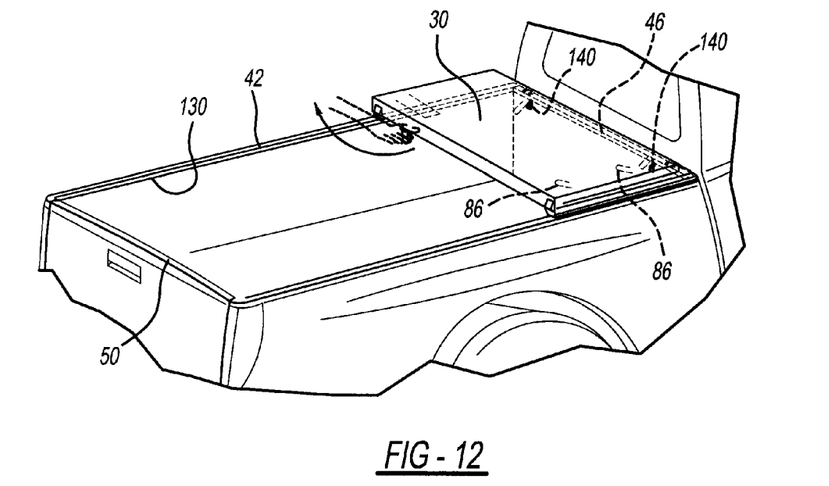
Figure 13:
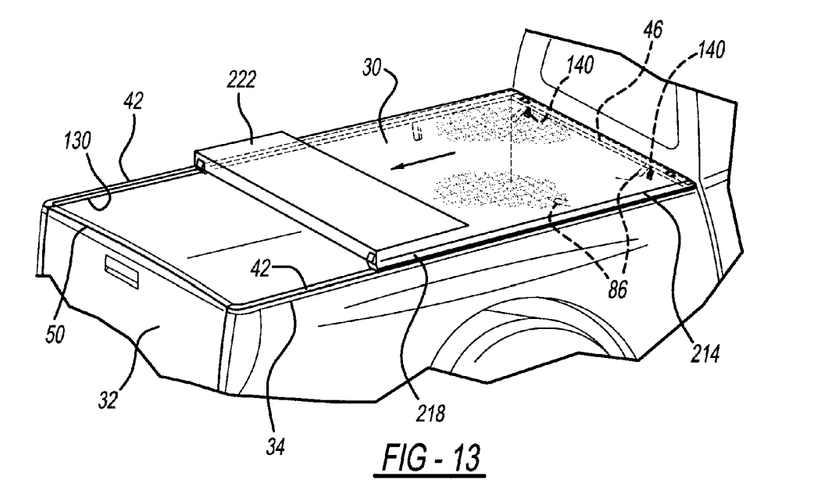
Figure 14:
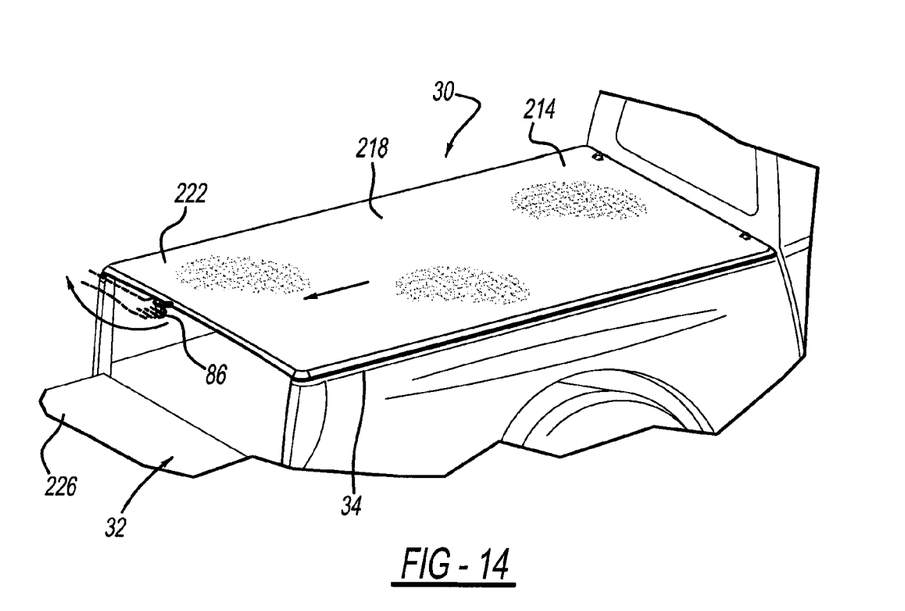

FIGS. 10-14 illustrate a method for installing the pickup truck tonneau cover 30. Pickup truck tonneau cover 30 and its associated rails 42, 46, 50 are initially in a folded state. Tonneau cover 30 may include a strap 206 wrapped around an outer portion when folded with one end riveted to a bow and the other end removably snapped to a top surface in order to maintain the folded state. Strap 206 must be unfastened such that tonneau cover 30 can be unfolded. Referring to FIG. 10, a front side 210 of outer frame 38 of tonneau cover 30 is aligned to a front of pickup truck bed perimeter 34 and side rails 42 using locator 102 of each of the tonneau cover apparatus 86. This allows the installer to simply drop the tonneau onto the bed and it self aligns with a mere "wiggle" or two of the folded assembly. Each tonneau cover apparatus 86 is in an installation state where the lever or handle 94 is in a closed or folded position and claw or finger (or clamp) 106 is fixed in an open position. Wedge 126 on each locator 102 is aligned in locations along side rails 42 of a first section 214 of folded assembly 30. Once first section 214 of folded tonneau cover 30 is aligned to the truck bed 32 (FIG. 9), lever 94 is moved to an open or extended position, and finger 106 is released from the fixed open position. Flat portion 174 of grip 166 on finger 106 is moved to a clamp position behind interior wall 130 of truck bed 32. Moreover, lever 94 is moved to a closed position, securing clamp 106, and thus tonneau cover apparatus 86 and tonneau cover 30, to interior wall 130. Once each tonneau cover apparatus 86 on first section 214 of tonneau cover 30 has been secured to interior wall 130 of truck bed 32, tonneau cover 30 is unfolded one time exposing a second section 218 of tonneau cover 30 (FIGS. 12-13).

Second section 218 of tonneau cover 30 is aligned to interior wall 130 of truck bed 32. Once second section 218 is aligned, tonneau cover 30 is unfolded one time exposing a third section 222 of tonneau cover 30.

Third section 222 of tonneau cover 30 is aligned to interior wall 130 of truck bed 32 and tailgate or liftgate 226 using locator 102 on each tonneau cover apparatus 86 on the third section 222. Once third section 222 of tonneau cover 30 is aligned to truck bed 32, liftgate 222 is lowered to access each tonneau cover apparatus 86 on third section 222. The same procedure as previously described for the first sections 214 is followed. Lever 94 of each tonneau cover apparatus 86 is moved to the extended position, and finger 106 is released from the fixed open position. Flat portion 174 of grip 166 on finger 106 is moved to the clamp position behind interior wall 130 of truck bed 32. Lever 94 is moved to a folded position, securing clamp 106, and thus tonneau cover apparatus 86 and tonneau cover 30, to interior wall 130. Once each tonneau cover apparatus 86 on third section 222 of tonneau cover 30 has been secured to interior wall 130 of truck bed 32, tonneau cover 30 is fully secured to truck bed 32. Complete installation of tonneau cover 30 on truck bed 32 can be completed within thirty seconds and without any separate loose parts or tools.

Tonneau cover 30 may be removed from truck bed 32 by following the installation method in reverse. Third section 222 is released from truck bed 32 by unclamping each tonneau cover apparatus 86 on third section 222. Lever 94 is moved from the folded position to the extended position. This releases claw 106 from interior wall 130 of truck bed 32. Claw 106 can be moved to the fixed open position, and lever 94 can be moved to the folded position for storing. This procedure can be repeated for each tonneau cover apparatus 86 on third section 222. Third section 222 may then be folded against second section 218. Second section 218, with third section 222, can be folded on top of first section 214 in an accordion-like fashion. Each tonneau cover apparatus 86 on first section 214 is unclamped from inner wall 130 by following the procedure explained for third section 222. Once each tonneau cover apparatus 86 has been released and returned to the folded position for storing, tonneau cover 30 can be removed from truck bed 32.

Additional applications filed on this same date contain information related to the above disclosure. These are U.S. patent application Ser. No. 13/537,897, entitled "TONNEAU COVER SYSTEM FOR A PICKUP TRUCK BED"; U.S. patent application Ser. No. 13/538,005, entitled "TONNEAU COVER FRAME FOR A PICKUP TRUCK BED"; U.S. patent application Ser. No. 13/538,149, entitled "TONNEAU COVER ASSEMBLY FOR A PICKUP TRUCK BED": and U.S. patent application Ser. No. 13/538,240, entitled "PICKUP TRUCK BED TONNEAU COVER SUPPORT STRUCTURE AND METHOD"; each of which has a filing date of Jun. 29, 2012. The entire disclosures of each of the above applications are incorporated herein by reference.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in alternative embodiments, even if not specifically shown or described. It should also be appreciated that any of the features and devices described and shown for certain embodiments herein can be substituted, interchanged or added to any of the other embodiments, although many advantages may not be fully realized. It is intended that these and other variations fall within the scope of the present invention.

The invention claimed is:

1. A tonneau cover apparatus for a vehicle comprising:
a mount;
a pickup truck bed cover overlaying the mount and being coupled to the mount;
a handle rotatably coupled to the mount such that the handle rotates about a substantially horizontal axis and is movable between an open position and a closed position, wherein the handle is substantially vertical when in the open position, wherein the handle is substantially horizontal when in the closed position, and wherein the handle is above a substantially horizontal plane extending across a pickup truck bed when in the closed position;

a clamp being pivotly connected to the handle such that when the handle is closed the clamp is fixed to the pickup truck bed; and a locator attached to the mount to locate the tonneau cover apparatus to predetermined locations on the pickup truck bed.

2. The tonneau cover apparatus of claim 1, further comprising a wedge on the locator for positioning the tonneau cover apparatus and increasing a clamped force exerted by the tonneau cover apparatus on the pickup truck bed to retain the tonneau cover apparatus on the pickup truck bed.

3. The tonneau cover apparatus of claim 2, wherein the wedge causes the mount to be pulled a predetermined angle less than substantially horizontal and increases the clamped force exerted by the tonneau cover apparatus on the truck bed when the tonneau cover apparatus is clamped to the truck bed.

4. The tonneau cover apparatus of claim 2, wherein the wedge is of an elastomeric material.

5. The tonneau cover apparatus of claim 1, further comprising a rail attached to the pickup truck bed cover for mating the pickup truck bed cover to the pickup truck bed, wherein the cover is attached along the length of the rail in both fully covering and folded up conditions.

6. The tonneau cover apparatus of claim 5, further comprising a seal and a stop on the rail, wherein the seal compresses against the pickup truck bed and deters water from entering between the cover and the bed and wherein the stop prevents the seal from further compressing and releasing the clamp from the pickup truck bed, the stop being along at least a majority length of the rail.

7. The tonneau cover apparatus of claim 1, wherein the clamp is fixed to an interior wall of the pickup truck bed when the handle is in the closed position.

8. The tonneau cover apparatus of claim 7, wherein the handle in the closed position is above a substantially horizontal plane extending across a base of the interior wall.

9. The tonneau cover apparatus of claim 1, further comprising a grip on the clamp that is of an elastomeric material and retains the clamp to the pickup truck bed.

10. The tonneau cover apparatus of claim 1, further comprising a detent on the mount and a peg on the handle, wherein the detent and peg cooperate to retain the handle in the closed position.

11. The tonneau cover apparatus of claim 1, wherein the handle is coupled to the mount by a pivot pin and the mount is coupled to an elongated rail that is foldable.

12. The tonneau cover apparatus of claim 1, wherein the pickup truck bed cover is of a flexible material and overlays the handle and mount when the handle is rotated to the closed position.

13. A tonneau cover apparatus comprising:
a bracket;
a pickup truck bed cover overlaying the bracket, wherein the bracket is attached to the pickup truck bed cover;
a lever being joined to the bracket such that the lever is movable between an extended position and a folded position;
a locator being attached to the bracket and acting as a wedge to locate the pickup truck bed cover to a desired location on a pickup truck bed; and
a finger coupled to the lever, wherein the finger is clamped in a vehicle-engaging orientation when the lever is in the folded position, and the finger is freely movable when the lever is in the extended position.

14. The tonneau cover apparatus of claim 13, further comprising a rail attached to the pickup truck bed cover.

15. The tonneau cover apparatus of claim 14, further comprising a strip on the rail that compresses against the pickup truck bed and protects an interior of the pickup truck bed and pickup truck bed cover from external elements.

16. The tonneau cover apparatus of claim 15, further comprising a stop on the rail preventing the strip from further compressing and releasing the finger from the pickup truck bed.

17. The tonneau cover apparatus of claim 13, wherein the lever is rotatably coupled to the bracket such that the lever rotates about a substantially horizontal axis.

18. The tonneau cover apparatus of claim 13, wherein the lever in the closed position is above a substantially horizontal plane extending across a base of an interior wall of the pickup truck bed.

19. The tonneau cover apparatus of claim 13, wherein the locator causes a force between the locator, the finger, and the pickup truck bed to increase when the tonneau cover apparatus is clamped to the pickup truck bed and the lever is in the folded position.

20. The tonneau cover apparatus of claim 13, wherein the locator is of an elastomeric material.

21. The tonneau cover apparatus of claim 13, further comprising a tip on the finger being of an elastomeric material and retaining the clamped finger to the pickup truck bed.

22. The tonneau cover apparatus of claim 13, wherein the pickup truck bed cover is of a flexible material.

23. A tonneau cover apparatus for a vehicle comprising:
an elongated side and front rail, wherein the side rails are foldable by at least one set of hinges;
at least one locator wedge on each of the front and side rails; and
a vehicle compartment having at least one tab,
wherein the locator wedge aligns with the tab such that the wedge pulls the side and front rails into alignment with the vehicle compartment as the wedge is inserted into the tab.

24. A tonneau cover apparatus for a vehicle comprising:
a tonneau cover latch having a mount and a handle, wherein the handle is pivotly coupled to the mount such that the handle is movable between an open position and a closed position;
a peg on the handle; and
a detent on the mount engaging the peg on the handle when the handle is moved to the closed position, wherein the detent retains the handle in the closed position.

25. The tonneau cover apparatus of claim 24, wherein the peg snaps over an edge of the detent and is retained in the detent by the edge when the handle is moved from the open position to the closed position.

26. The tonneau cover apparatus of claim 24, wherein the handle is rotatably coupled to the mount such that the handle rotates about a substantially horizontal axis.

27. The tonneau cover apparatus of claim 24, wherein the handle in the closed position is above a substantially horizontal plane extending across a top of a vehicle compartment.

28. The tonneau cover apparatus of claim 24, further comprising a locator on the mount for locating the tonneau cover latch to a predetermined alignment feature on a vehicle compartment.

29. The tonneau cover apparatus of claim 24, further comprising a claw movably fixed to the handle such that when the handle is closed the claw is fixed to a vehicle.

30. The tonneau cover apparatus of claim 24, wherein the handle and the peg are of a polymeric material.

31. The tonneau cover apparatus of claim 24, wherein the mount and the detent are of a polymeric material.

32. The tonneau cover apparatus of claim 24, further comprising a sheet overlaying the mount, wherein the mount is attached to the sheet, and the sheet is of a flexible material.

33. A tonneau cover apparatus comprising:
a mount being of a polymeric material;
a storage compartment cover overlaying the mount, fixed to the mount, and being of a flexible material;
a handle being of a polymeric material and being rotatably joined to the mount such that the handle rotates about a substantially horizontal axis and is movable between an open position and a closed position, wherein the handle is substantially vertical when in the open position, wherein the handle is substantially horizontal when in the closed position, and wherein the handle is above a substantially horizontal plane extending across a top of a storage compartment when in the closed position;
a finger being movably fixed to the handle, wherein the finger is in a clamping position when the handle is in the closed position and the finger is freely movable when the handle is in the open position;
a grip being of an elastomeric material and being attached to the finger such that when the finger is clamped to storage compartment the grip is directly adjacent to an interior wall of storage compartment and prevents the finger from unintentionally releasing the storage compartment;
a plurality of arms coupling the grip to the finger and hinging the finger to the handle;
a locator being attached to the bracket and locating storage compartment cover to an aligned position on the storage compartment, wherein the locator is clamped to the storage compartment when the lever portion is in the closed position;
a wedge being of an elastomeric material on the locator and locating each tonneau cover apparatus to a predetermined location on the storage compartment;
an arm coupling the wedge to the locator and the locator to the bracket;
a fastener coupling the locator to the bracket;
a peg being on one of the handle and the bracket; and
a detent being on the other of the handle and the bracket engaging the peg when the handle is moved to the closed position, wherein the detent retains the handle in the closed position.

34. A method of installing a tonneau cover, the method comprising:
(a) positioning elongated and foldable rails on top of a truck bed;
(b) locating at least a first fore-after orienting projection against a front edge of the truck bed;
(c) locating at least a second cross-vehicle orienting projection against a side wall of the truck bed; and
(d) clamping the rails to the truck bed by moving at least one latch lever from an open position to a closed position,
(e) wherein the final assembly of the tonneau cover to the truck bed is completed within thirty seconds.

35. The method of claim 34, further comprising clamping the rails of a first section and then a third section of the tonneau cover.

36. The method of claim 34, further comprising unfolding the tonneau cover after a section of the tonneau cover is installed and the at least one latch lever is in the closed position.

37. The method of claim 34, wherein the latch lever is substantially vertical when in the open position, and wherein the latch lever is substantially horizontal when in the closed position.

38. The method of claim 34, wherein the latch lever in the closed position is above a substantially horizontal plane extending across a base of the side wall.

39. The method of claim 34, further comprising moving a peg against a detent to retain the latch lever in the closed position.

40. The method of claim 34, wherein a finger engaged with the latch lever is clamped to the truck bed when the latch lever is in the closed position and the finger is freely movable when the latch lever is in the open position.

41. The method of claim 40, wherein the finger is in a storage position if the finger is suspended and freely movable.

42. The method of claim 34, further comprising folding a section of the rails to access below the plane of the nominally covering tonneau cover, the tonneau cover being attached to all of the rails in a folded and nominal position.

* * * * *